US012308541B2

(12) United States Patent
Chen et al.

(10) Patent No.: US 12,308,541 B2
(45) Date of Patent: May 20, 2025

(54) BOARD-TO-BOARD SOCKET

(71) Applicant: SHENZHEN EVERWIN PRECISION TECHNOLOGY CO., LTD., Guangdong (CN)

(72) Inventors: Xiaoshuo Chen, Guangdong (CN); Yiping Shi, Guangdong (CN)

(73) Assignee: SHENZHEN EVERWIN PRECISION TECHNOLOGY CO., LTD., Guangdong (CN)

( * ) Notice: Subject to any disclaimer, the term of this patent is extended or adjusted under 35 U.S.C. 154(b) by 435 days.

(21) Appl. No.: 17/937,189

(22) Filed: Sep. 30, 2022

(65) Prior Publication Data

US 2023/0036015 A1 Feb. 2, 2023

Related U.S. Application Data

(63) Continuation of application No. PCT/CN2020/141931, filed on Dec. 31, 2020.

(30) Foreign Application Priority Data

Jun. 16, 2020 (CN) ........................ 202010547827.X
Jun. 16, 2020 (CN) ........................ 202021116910.3

(51) Int. Cl.
*H01R 12/70* (2011.01)
*H01R 12/71* (2011.01)

(52) U.S. Cl.
CPC ....... *H01R 12/7023* (2013.01); *H01R 12/716* (2013.01)

(58) Field of Classification Search
CPC .. H01R 12/7023; H01R 12/716; H01R 12/73; H01R 12/707; H01R 13/20; H01R 13/46
See application file for complete search history.

(56) References Cited

U.S. PATENT DOCUMENTS

2016/0315430 A1 10/2016 Takeuchi et al.
2019/0181572 A1 6/2019 Ono
(Continued)

FOREIGN PATENT DOCUMENTS

CN 102201628 A 9/2011
CN 104051882 A 9/2014
(Continued)

OTHER PUBLICATIONS

Japanese Office Action dated Sep. 27, 2023, in corresponding JP Patent Application No. 2022554404.
(Continued)

*Primary Examiner* — Abdullah A Riyami
*Assistant Examiner* — Nader J Alhawamdeh
(74) *Attorney, Agent, or Firm* — Wiersch Law Group

(57) ABSTRACT

Provided is a board-to-board socket, comprising a socket body, a socket terminal, and a socket reinforcing member; said socket body comprises a bottom wall, socket side walls formed by protruding upward from two longitudinal ends of the bottom wall, socket guide parts formed at two lateral ends of the socket body, and an island part; the socket guide part comprises a plug guide part receiving cavity, a longitudinal peripheral wall, and a pair of lateral peripheral walls; the socket reinforcing member comprises a main body part covering surface of the longitudinal peripheral wall, lateral peripheral wall covering parts which extend from two longitudinal sides of the main body part in the lateral direction and cover the lateral peripheral walls, a protection part formed by bending and extending inward from top ends of the lateral peripheral wall covering parts, and an elastic arm part continuously extending from the protection part.

20 Claims, 12 Drawing Sheets

(56) References Cited

U.S. PATENT DOCUMENTS

| | | | | |
|---|---|---|---|---|
| 2023/0006381 | A1* | 1/2023 | Li | H01R 12/73 |
| 2023/0009513 | A1* | 1/2023 | Chen | H01R 13/46 |
| 2023/0036015 | A1* | 2/2023 | Chen | H01R 12/7023 |

FOREIGN PATENT DOCUMENTS

| | | | | | |
|---|---|---|---|---|---|
| CN | 110571555 | A | | 12/2019 | |
| CN | 110896181 | A | * | 3/2020 | H01R 13/2435 |
| CN | 111769388 | A | | 10/2020 | |
| JP | 2015115200 | A | | 6/2015 | |
| JP | 2016184505 | A | | 10/2016 | |
| JP | 2018078072 | A | | 5/2018 | |
| JP | 2019135726 | A | | 8/2019 | |
| JP | 2020064766 | A | | 4/2020 | |

OTHER PUBLICATIONS

International Search Report from International Application No. PCT/CN2020/141931 mailed Apr. 7, 2021.

Chinese Notification to Grant Patent Right for Invention dated May 24, 2024, in corresponding CN Patent Application No. 202010547827. X, 5 pgs.

* cited by examiner

BOARD-TO-BOARD SOCKET

This application is a continuation of International Application No. PCT/CN2020"141931, filed on Dec. 31, 2020, which claims priority to Chinese Patent Application No. 202010547827.X, filed on Jun. 16, 2020 and Chinese Patent Application No. 202021116910.3, filed on Jun. 16, 2020. All of the aforementioned applications are hereby incorporated by reference in their entireties.

TECHNICAL FIELD

The present disclosure relates to the field of electrical connectors, and in particular, to a board-to-board socket.

BACKGROUND

Board-to-board connector assemblies are widely used in the field of consumer electronics, such as smart phones, tablets, and wearable devices. Current smart phones and wearable devices have extremely high requirements on space, with components in reduced sizes. A minimum height of a board-to-board plug of front-line board-to-board manufacturers has reached an ultra-low height of 0.6 mm after being engaged with a socket, and a pitch between terminals has reached a distance of 0.25 mm. Such a tiny connector puts forward a high requirement on structural strength of the connector. Moreover, compared with conventional board-to-board connector assemblies, large-scale functional integration of existing smart phones puts forward a higher requirement on current carrying capacity. For example, liquid crystal displays require current transmission capacity to be up to SA. The design of the conventional board-to-board connector assemblies is incapable of adapting to current market requirements on strength and current transmission.

SUMMARY

In view of the above, there is a need to provide a board-to-board socket, which ensures that a socket reinforcing member can be well protected on the basis of a simple structure and good mass production, preventing damages to an elastic arm part.

In order to solve the above technical problem, the present disclosure provides a board-to-board socket, including: a socket body; a socket terminal; and a socket reinforcing member. The socket body includes a bottom wall, socket side walls formed by protruding upward from two longitudinal ends of the bottom wall, socket guide parts formed at two lateral ends of the socket body, and an island part formed by protruding upward from the bottom wall. Each of the socket guide parts includes a plug guide part receiving cavity, a longitudinal peripheral wall located at a lateral outer side of the plug guide part receiving cavity, and a pair of lateral peripheral walls located at two longitudinal sides of the plug guide part receiving cavity. The socket reinforcing member includes a main body part covering a surface of the longitudinal peripheral wall, lateral peripheral wall covering parts which extend from the main body part and cover the lateral peripheral walls, and an elastic arm part and a protection part formed by bending and extending from top ends of the lateral peripheral wall covering parts toward a side of the plug guide part receiving cavity. The elastic arm part includes: an inclined connecting arm formed by bending and extending obliquely downward from the lateral peripheral wall covering parts, a contact arm part formed by bending vertically from the inclined connecting arm, and a contact convex part formed by stamping from the contact arm part toward the plug guide part receiving cavity. An end of the contact arm part extends to a side of the protection part along the lateral direction.

In order to solve the above technical problem, the present disclosure also provides a board-to-board socket, including: A board-to-board socket, including: a socket body; a socket terminal; and a socket reinforcing member. The socket body includes a bottom wall, socket side walls formed by protruding upward from two longitudinal ends of the bottom wall, socket guide parts formed at two lateral ends of the socket body, and an island part formed by protruding upward from the bottom wall. Each of the socket guide parts includes a plug guide part receiving cavity, a longitudinal peripheral wall located at a lateral outer side of the plug guide part receiving cavity, and a pair of lateral peripheral walls located at two longitudinal sides of the plug guide part receiving cavity. The socket reinforcing member includes a main body part covering a surface of the longitudinal peripheral wall, lateral peripheral wall covering parts which extend from the main body part and cover the lateral peripheral walls, and a protection part formed by bending and extending from top ends of the lateral peripheral wall covering parts toward a side of the plug guide part receiving cavity. The protection part includes a first protection part and a second protection part in a lateral direction, and the first protection part continues to extend obliquely downward to form an elastic arm part. The elastic arm part includes: an inclined connecting arm formed by extending obliquely from the first protection part, a contact arm part formed by bending vertically from the inclined connecting arm, and a contact convex part formed by stamping from the contact arm part toward the plug guide part receiving cavity. An end of the contact arm part extends to a side of the second protection part along the lateral direction, and when viewed along a downward direction, a partition slot is formed between the second protection part and the contact arm part.

According to the board-to-board socket of the present disclosure, the contact arm part of the elastic arm part is extended to one side of the protection part in the lateral direction, so that, when the plug reinforcing member is inserted, the inclined connecting arm is squeezed to drive the contact arm part, to approach one side of the protection part in the longitudinal direction to prevent damages to the contact arm part by the plug.

According to the board-to-board socket provided by the present disclosure, the top ends of the lateral peripheral wall covering parts are bent and extend toward the plug guide part receiving cavity to form first and second protection parts in a lateral direction, and then the first protection part continues to extend to form the elastic arm part. The contact arm part of the elastic arm part is connected to the first protection part through the inclined connecting arm, and the contact arm part extends to a side of the second protection part and is cut away from the second protection part to form a partition slot. In this way, sufficient elastic force of the contact arm part can be ensured and the protection from the first and second protection parts can be obtained, thereby avoiding easily causing damage by the insertion.

BRIEF DESCRIPTION OF DRAWINGS

The accompanying drawings illustrated herein are intended to provide further illustration of the present disclosure and form part of the present disclosure, and schematic embodiments of the present disclosure and the descriptions thereof are intended to explain the present disclosure and do not constitute improper limitations on the present disclosure.

FIG. 1 is an assembled view of a board-to-board connector assembly according to Embodiment one;

FIG. 2 is a sectional view taken along A-A shown in FIG. 1;

FIG. 3 is a three-dimensional assembled view of a board-to-board plug according to Embodiment one;

FIG. 4 is a three-dimensional view and a partial enlarged view of a plug body of the board-to-board plug according to Embodiment one;

FIG. 5 is a three-dimensional view of a plug reinforcing member of the board-to-board plug according to Embodiment one;

FIG. 6 is a three-dimensional view of the plug reinforcing member of the board-to-board plug according to Embodiment one from another perspective;

FIG. 7 is a three-dimensional assembled view of a board-to-board socket according to Embodiment one;

FIG. 8 is a three-dimensional view and a partial enlarged view of a socket body of the board-to-board socket according to Embodiment one;

FIG. 9 is a three-dimensional view of a socket reinforcing member of the board-to-board socket according to Embodiment one;

FIG. 10 is a top view of the socket reinforcing member of the board-to-board socket according to Embodiment one;

FIG. 11 is a sectional view taken along B-B shown in FIG. 1;

DESCRIPTION OF EMBODIMENTS

In order to make the objectives, technical solutions and advantages of the present disclosure clearer, the technical solutions of the present disclosure will be described in detail below in combination with specific embodiments of the present disclosure and the corresponding accompanying drawings.

Figure 1:
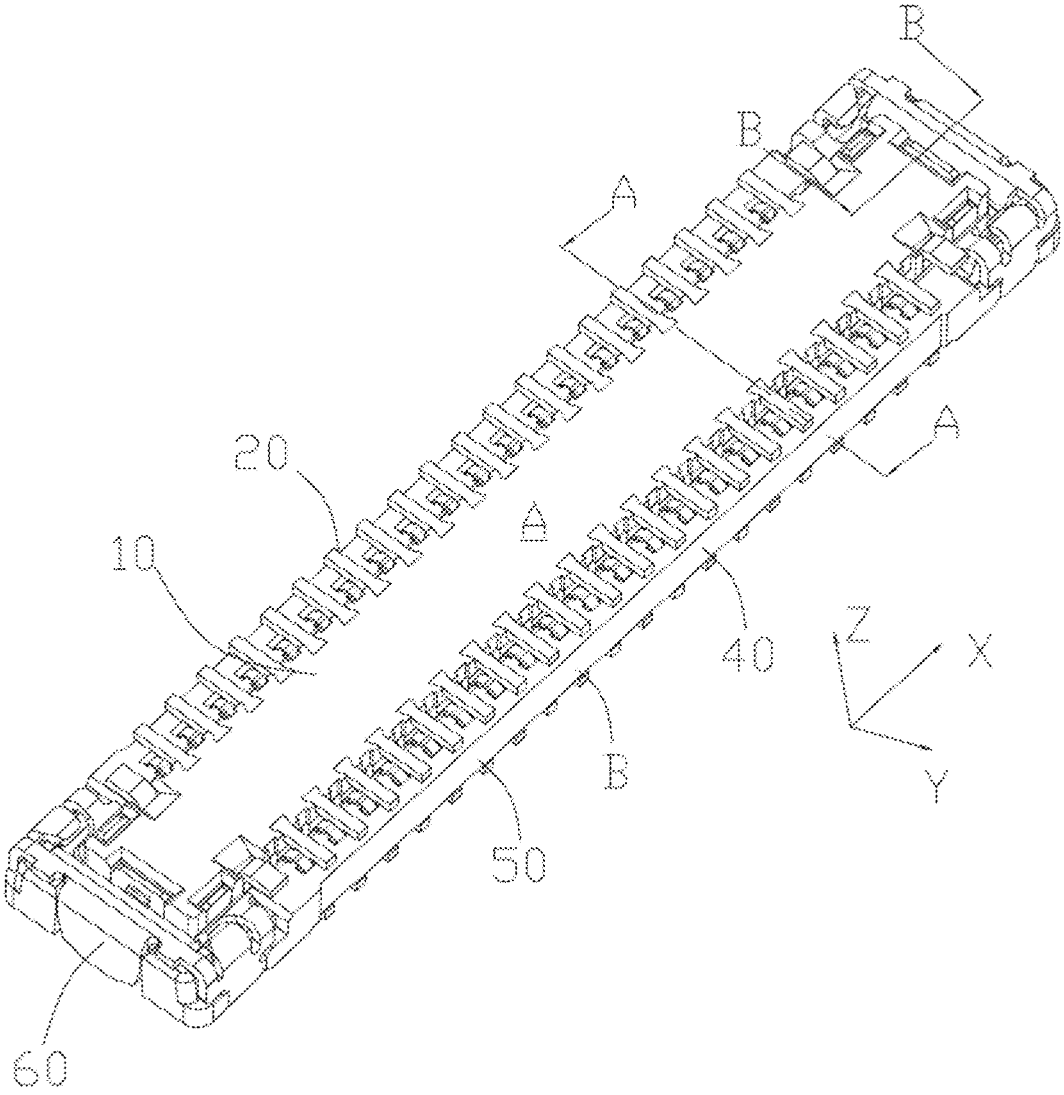
FIG. 1 to FIG. 11 show a board-to-board connector assembly.

Directions in the present disclosure are defined as follows. As shown in FIG. 1, Direction X is a right direction of left and right directions (or lateral direction), Direction Y is a front direction of front and back directions (or longitudinal direction), and Direction Z is an up direction of up and down directions (i.e., vertical direction).

Embodiment One

Referring to FIG. 1, a board-to-board connector assembly in the present disclosure includes a plug A attached to a printed circuit board and a socket B attached to another printed circuit board. The plug A is interlocked with and connected to the socket B.

The plug A includes a plug body 10, several socket terminals 20 formed to the plug body 10, and a plug reinforcing member 30 fixed to two lateral ends of the plug body 10. The socket B includes a socket body 40, socket terminals 50 mounted to the socket body 40, and a socket reinforcing member 60 mounted and fixed to two lateral ends of the socket body 40.

Referring to FIG. 2 to FIG. 6, the plug body 10 of the plug A includes a top wall 11, a pair of plug side walls 12 formed by extending downward from two longitudinal ends of the top wall 11, plug guide parts 14 formed at two lateral ends of the plug body 10, and an island part receiving cavity 13 formed between the top wall 11, the pair of plug side walls 12, and the plug guide parts 14.

The plug terminals 20 are formed on the pair of plug side walls 12 and are arranged in two rows in the lateral direction. The plug guide part 14 includes a bottom surface 141, a longitudinal outer side surface 142, a pair of lateral outer side surfaces 143, and a slope 144 toward the island receiving cavity 13. The longitudinal outer side surface 142 is provided with a first notch 1421. The lateral outer side surfaces 143 each include two bumps 1431 and 1432 protruding longitudinally, a second notch 1433 located between the two bumps 1431 and 1432, and a third notch 1434 located between the bump 1432 and the plug side wall 12. The slope 144 includes an inclined plane 1441 upward from the bottom surface 141 to the top wall 11, and a clamping hole 1442 recessed upward from the inclined plane 1441 at one side near the bottom surface 141.

The plug reinforcing member 30 includes a covering base part 31 longitudinally covering the bottom surface 141 of the plug guide part 14, a longitudinal outer side surface covering part 35 and a longitudinal inner side surface covering part 34 formed by bending and extending upward from two lateral ends of the covering base part 31 and covering the longitudinal outer side surface 142 and clamped into the clamping hole 1442, and a lateral outer side surface covering part 33 formed by bending and extending upward from two longitudinal ends of the covering base part 31 and covering the outer side of the lateral outer side surface 143. The longitudinal outer side surface covering part 35 is clamped into the first notch 1421.

The lateral outer side surface covering part 33 includes a contact part 331 clamped into the second notch 1421, and a solder pin 332 formed by vertically bending from a top of one end of the lateral outer side surface covering part 33 away from the longitudinal outer side surface covering part 35 toward a longitudinal outer side. The contact part 331 of the lateral outer side surface covering part 33 is clamped into the second notch 1433, The solder pin 332 is clamped into the third notch 1434 and then bends vertically toward the longitudinal outer side. The lateral outer side surface covering part 33 is further provided with a bayonet 333 to be clamped into a periphery of the bump 1432 to enhance retaining force between the plug reinforcing member 30 and the plug guide part 14.

Figure 2:
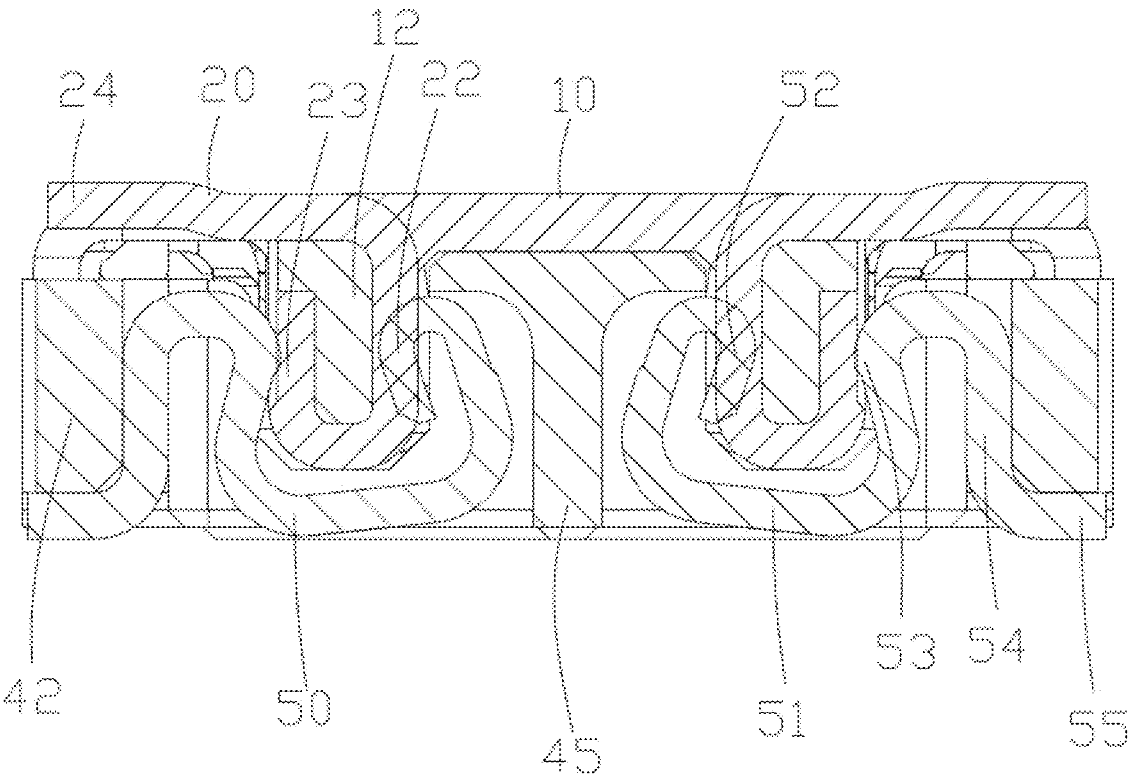
Figure 3:
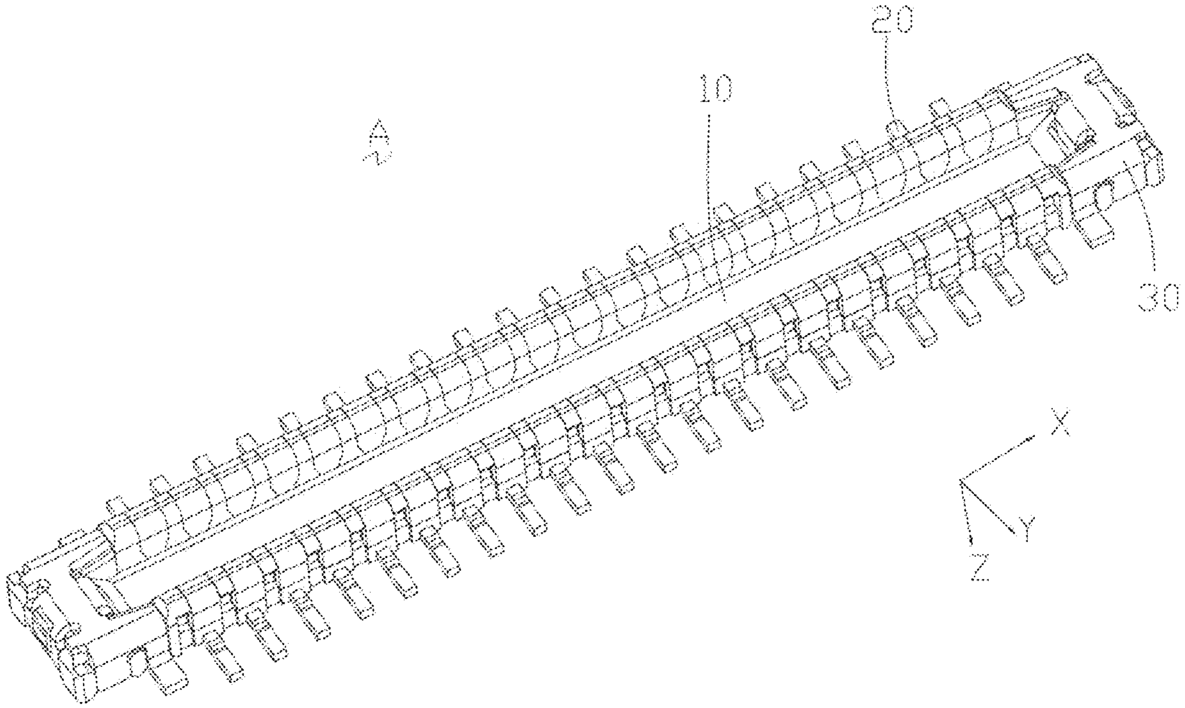
Figure 4:
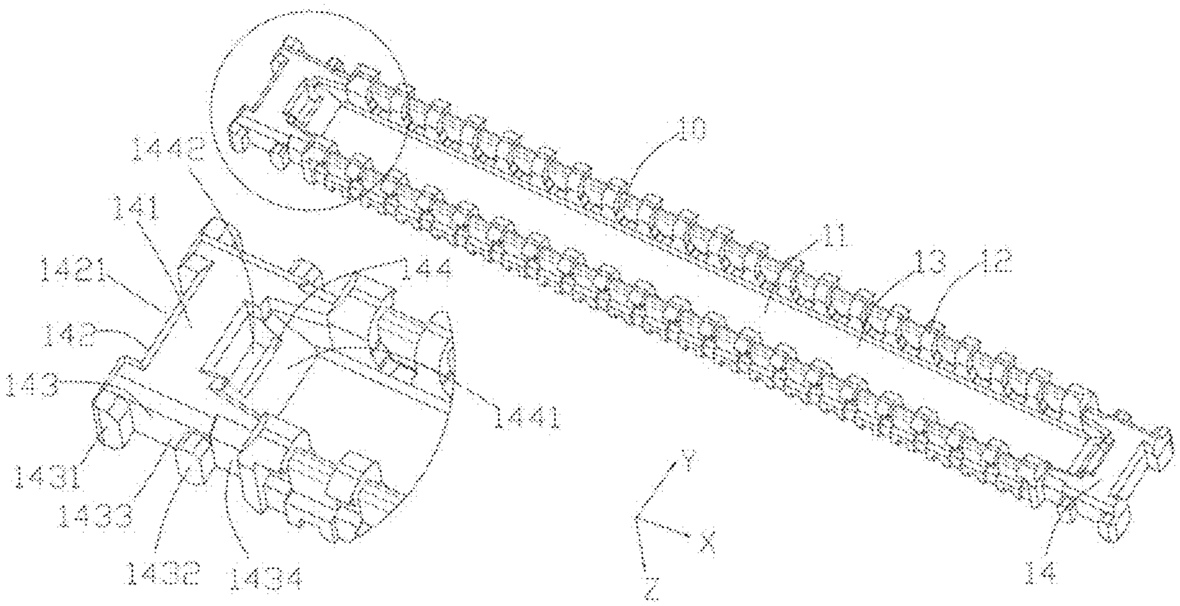
Figure 5:
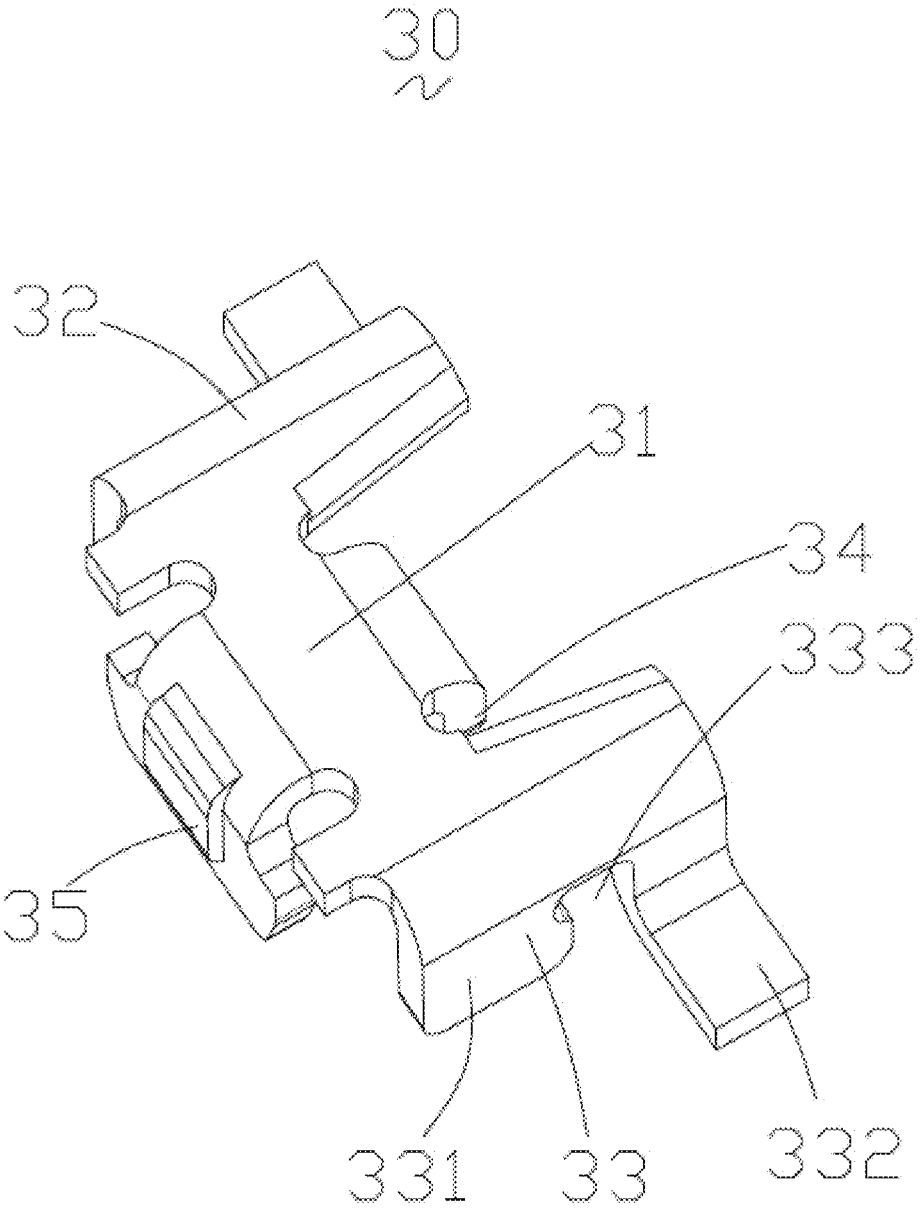
Figure 6:
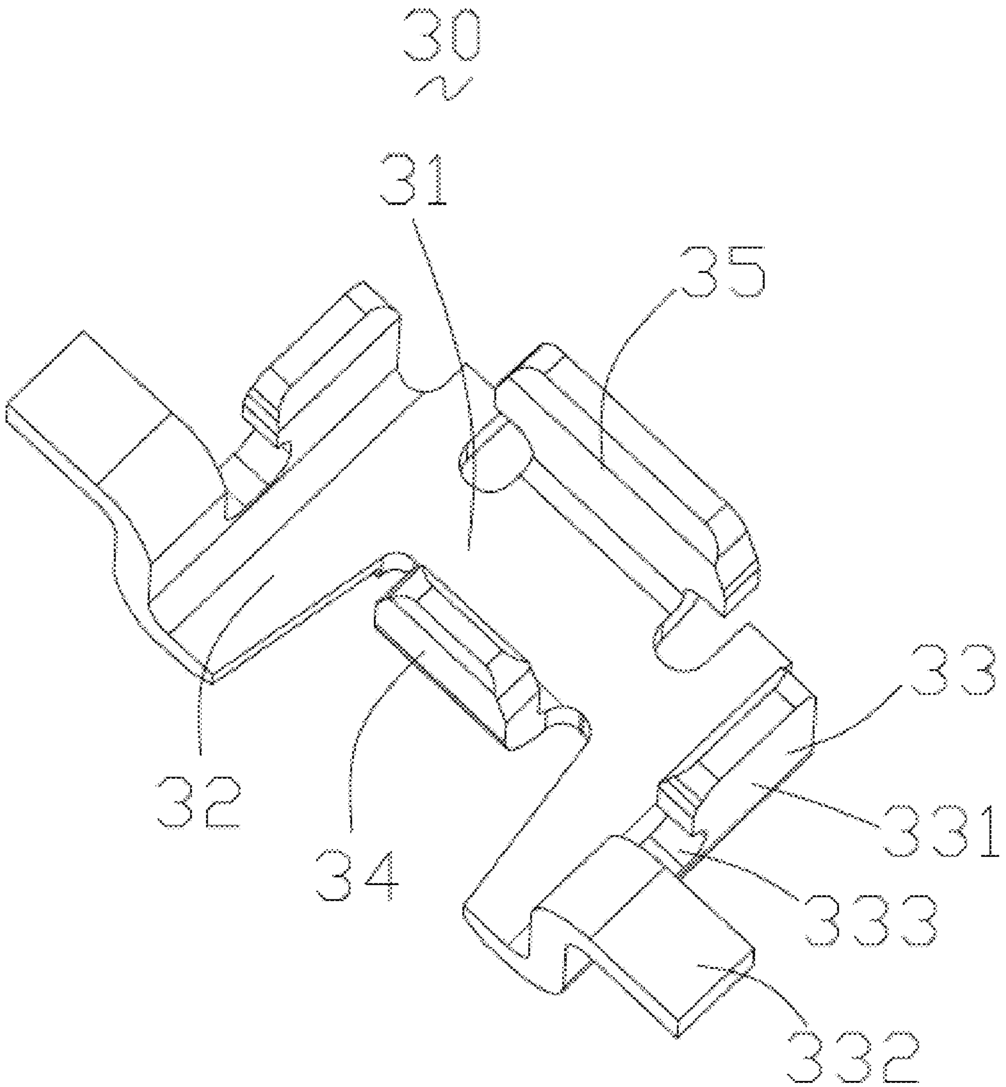
Figure 7:
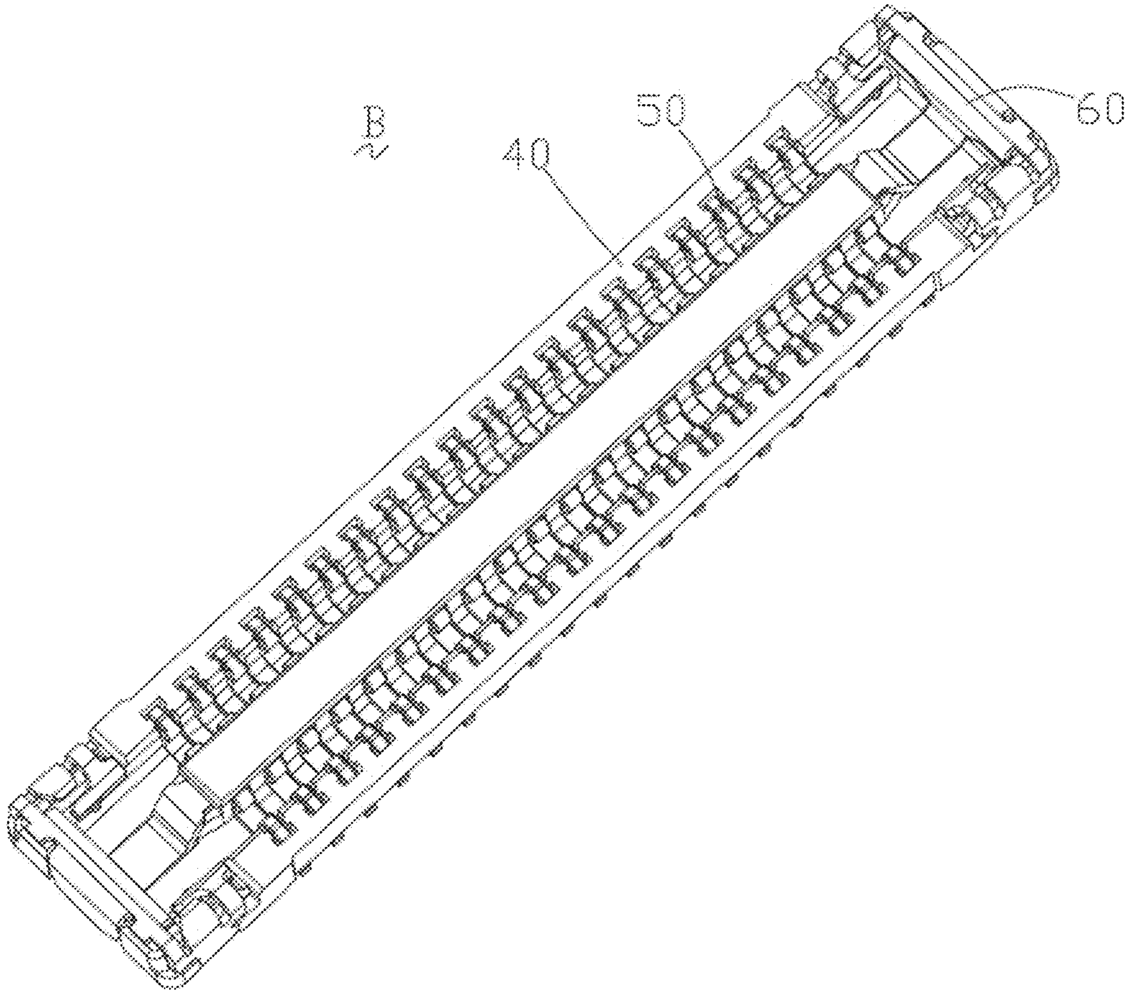

Particularly referring to FIG. 2, the plug terminal 20 includes a plug terminal solder pin 24 extending longitudinally from an upper surface of the top wall 11 to outside the top wall 11, a plug terminal first contact part 22 bending from the plug terminal solder pin 24 along a surface of the top wall 11 to an inner side surface of the plug side wall 12, and a plug terminal second contact part 23 bending and extending reversely from a lower end of the plug terminal first contact part 22 to an outer side surface of the plug side wall 12. The plug terminal second contact part 23 is provided with a recess structure.

Still referring to FIG. 1, FIG. 2, FIG. 7 and FIG. 8, the socket body 40 of the socket B of the board-to-board connector assembly according to the present disclosure includes a bottom wall 41, a pair of socket side walls 42 formed by extending upward from two longitudinal sides of the bottom wall 41, an island part 45 formed by protruding upward from the bottom wall 41 and located between the pair of socket side walls 42, socket guide parts 44 formed at two lateral ends of the socket body 40, and a plug side wall receiving cavity 43 formed between the island part 45 and the pair of socket side walls 42.

The bottom wall of the socket body 40 is provided with several terminal slots 46 along an upward direction. The socket terminal 50 is assembled upward in the terminal slots 46. The socket terminal 50 includes a support arm part 51 extending into the terminal slot 46 at the bottom wall 41 and exposed to a bottom of the terminal slot 46, a socket terminal second contact part 52 formed by bending and extending upward from a longitudinal outer side of the support arm part 51 and located at a longitudinal side surface of the island part 45 and toward the socket side wall 42, a socket terminal first contact part 53 formed by bending upward from a longitudinal inner side of the support arm part 51 and located at a longitudinal side surface of the socket side wall 42, a retaining part 54 formed by bending and extending reversely from a top end of the first contact part 53, and a solder pin 55 bending vertically from a lower end of the retaining part 54 and extending longitudinally outward to a lower surface of the bottom wall 41 of the socket body 40.

When the plug A is engaged with the socket B, the island part 45 is received in the island part receiving cavity 13 of the plug A, the plug side wall 12 of the plug A is received in the plug side wall receiving cavity 43 of the socket B, and the plug guide part 14 is guided into the socket guide part 44. The plug terminal 20 is clamped between the socket terminal first and second contact parts 53 and 52 of the socket terminal 50. The first and second contact parts 22 and 23 of the plug terminal 20 are electrically contacted with the first and second contact parts 53 and 52 of the socket terminal 50, respectively.

Figure 8:
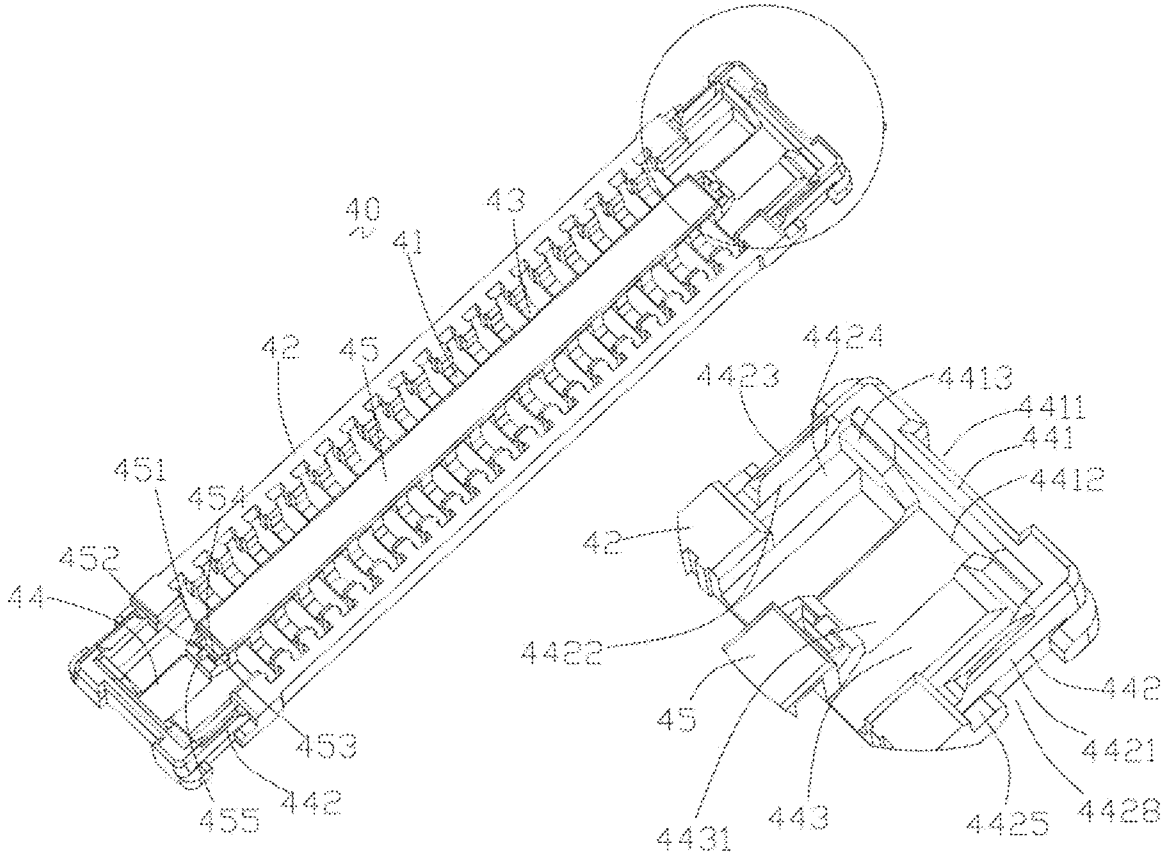

Particularly referring to FIG. 8, two lateral ends of the island part 45 are provided with protected parts 451 toward the socket guide parts 44. The protected part 451 includes a mesa part 453 whose horizontal plane is lower than the island part 45, an avoiding slope 452 formed by tilting obliquely downward from the mesa part 453, an engaging slot 454 recessed downward from the mesa part 453, and a communication notch 455 communicated with the avoiding slope 452 and arranged from the engaging slot 454 toward a lateral outer side.

The socket guide part 44 includes peripheral walls 441 and 442 and a plug guide part receiving cavity 443 located between the peripheral walls 441 and 442. The peripheral wall 441 includes a longitudinal peripheral wall 441, and a pair of lateral outer peripheral walls 442 connected to two ends of the longitudinal peripheral wall 441. The lateral outer peripheral wall 442 is adjacent to the socket side wall 42.

A through opening 4431 running through in an up-down direction corresponding to lateral extension of the island part 45 is formed at the plug guide part receiving cavity 443. The through opening 4431 extends to a lower end of the longitudinal peripheral wall 441. First and second extending slots 4411 and 4412 are formed at lateral outer and inner sides of the longitudinal peripheral wall 441, respectively. The second extending slot 4412 is communicated with the through opening 4431. The longitudinal peripheral wall 442 protrudes upward at a middle position to form a support shoulder 4421. A periphery of the support shoulder 4421 is provided with a mounting step part 4425 located at a longitudinal outer side of the support shoulder 4421 and extending in the lateral direction, and an elastic avoiding part 4424 located at a longitudinal inner side of the support shoulder 4421. The support shoulder 4421 gradually thins along an upward direction, to form a thicker part 4422 and a thinner part 4423, The thinner part 4423 gradually thins along an upward direction. The thinner part 4423 forms a large inclined plane at a side of the plug guide part receiving cavity 441. The thinner part 4423 forms a small inclined plane at an end of the longitudinal outer side. Stair parts 4413 are formed at two longitudinal ends of the longitudinal peripheral wall 441 at an inner side of the plug guide part receiving cavity 443, respectively. The mounting step part 4425 partially runs vertically through to form a third extending slot 4428.

Figure 9:
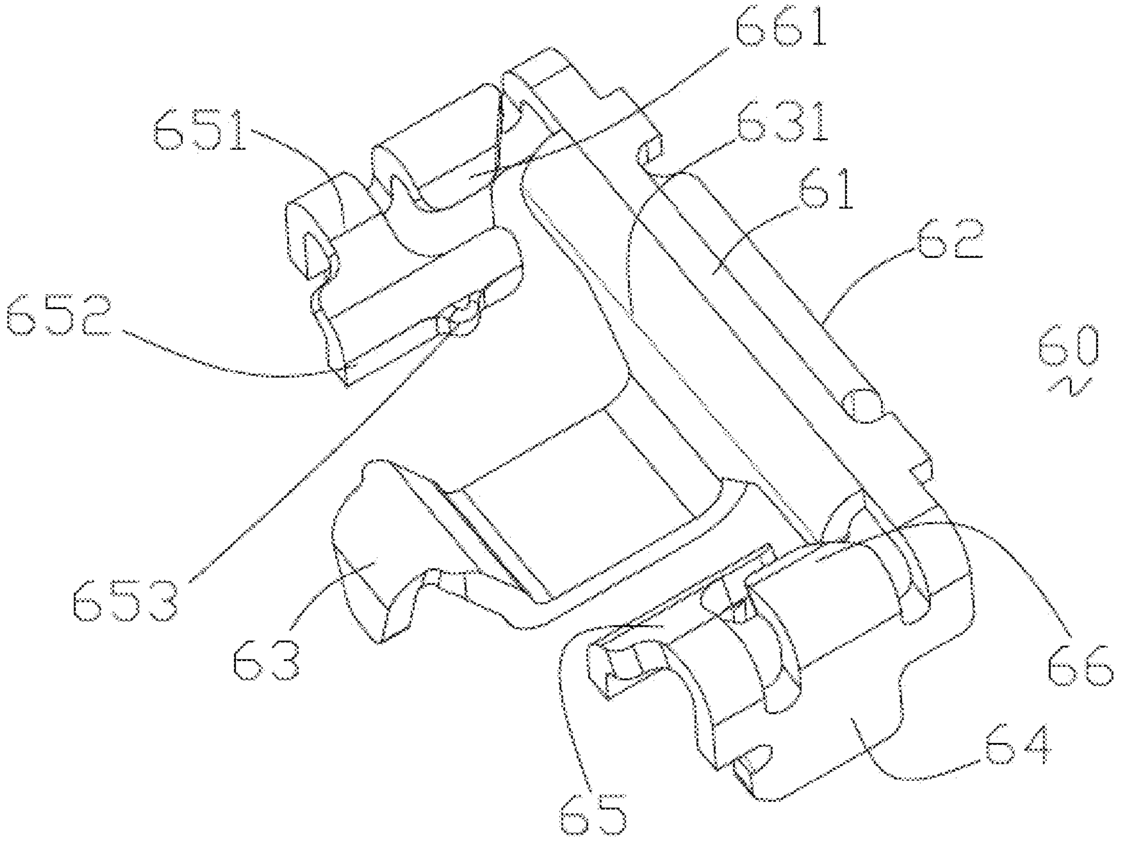
Figure 10:
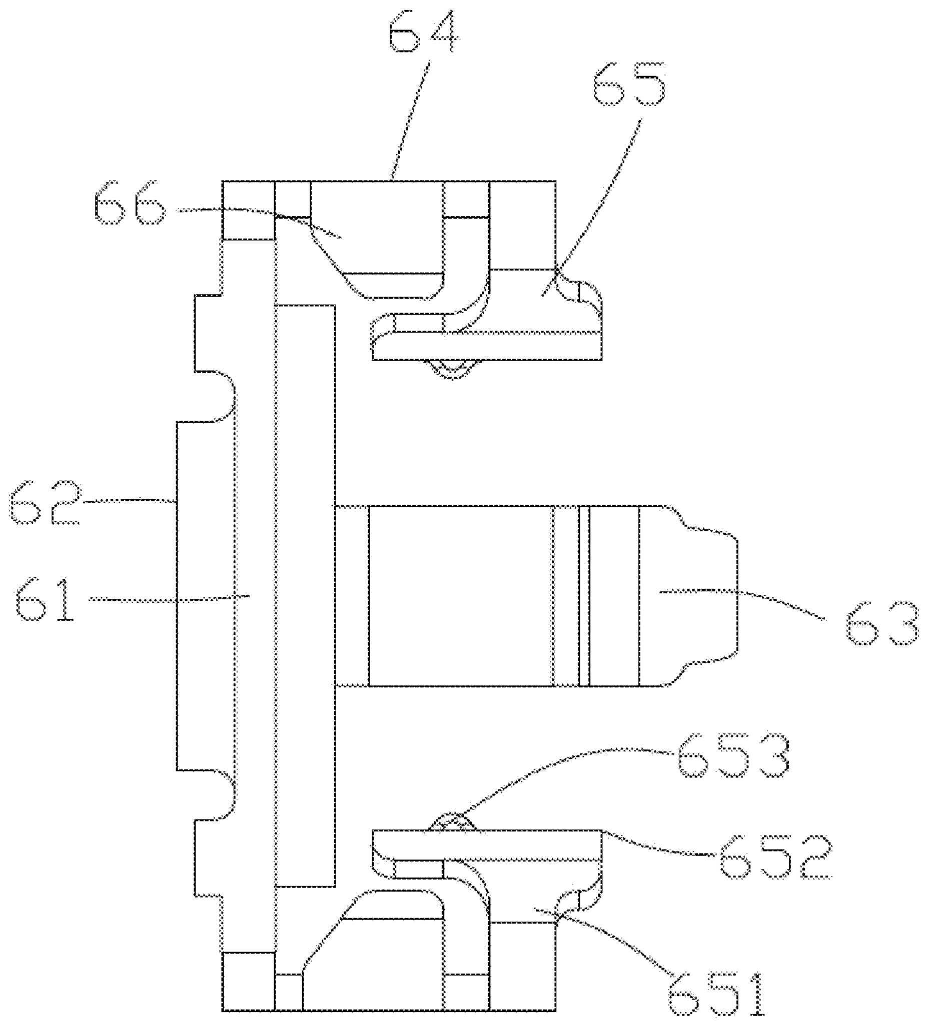
Figure 11:
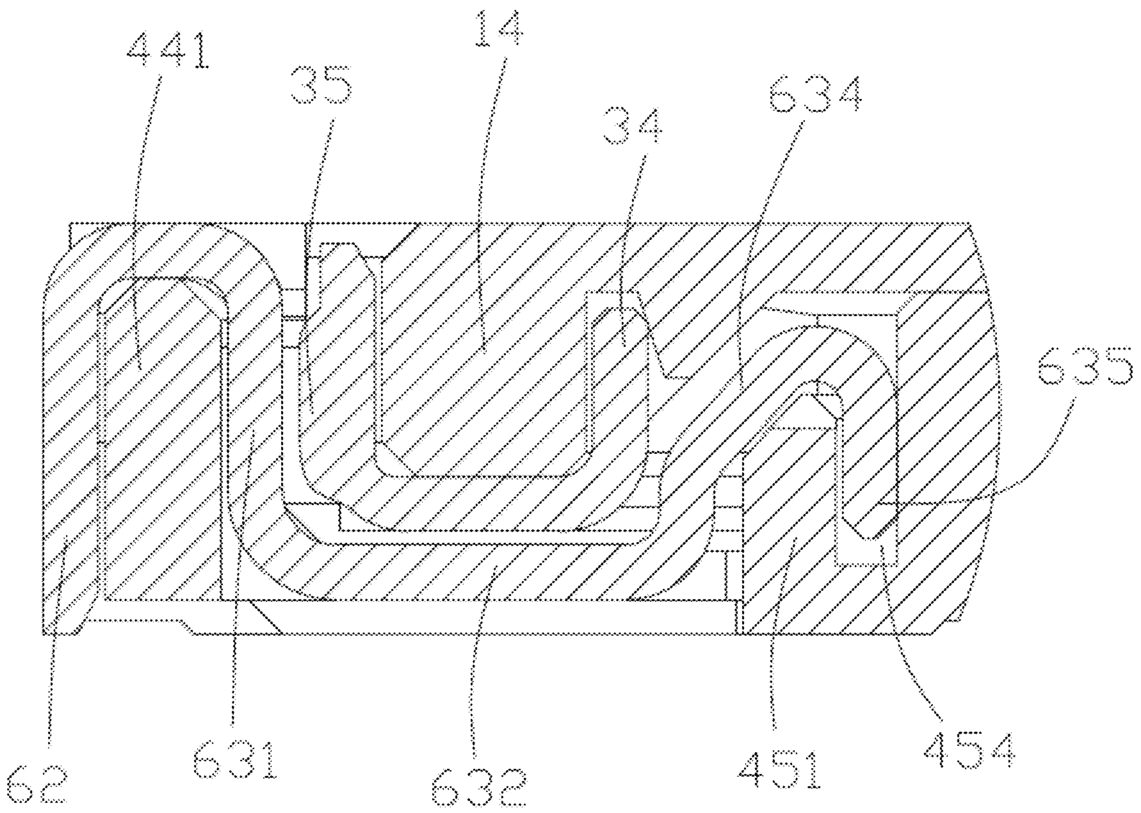

Still referring to FIG. 9 to FIG. 11, the socket reinforcing member 60 includes a main body part 61 longitudinally covering a top surface of the longitudinal peripheral wall 441, a longitudinal peripheral wall cover part 62 bending and extending downward from a lateral outer end of the main body part 61 into the first extending slot 4411, a central guide part 63 bending downward from a lateral inner side of the main body part 61 and extending to the protected part 451 at a lateral end part of the island part 45, a lateral peripheral wall cover part 64 formed by bending downward from two longitudinal ends of the main body part 61 and extending along the mounting step part 4425 and located at a longitudinal outer side of the longitudinal peripheral wall 442, a protection part 66 bending from a top end of the lateral peripheral wall cover part 64 toward the plug guide part receiving cavity 443 and located at the support shoulder 4421, and an elastic arm part 65 bending from the top of the lateral peripheral wall cover part 64 toward the plug guide part receiving cavity 443 and extending to the elastic avoiding part 4424.

An edge of the protection part 66 at a side of the plug guide part receiving cavity 443 extends obliquely downward to guide the insertion of the plug reinforcing member 30. The elastic arm part 65 includes an inclined connecting arm 651 formed by bending from the top of the lateral peripheral wall cover part 64 along the support shoulder 4421 toward the plug guide part receiving cavity 443, a contact arm part 652 formed by extending vertically downward from a free end of the inclined connecting arm 651, and a contact convex part 653 formed by stamping from the contact arm part 652 toward the plug guide part receiving cavity 443. The contact arm part 652 extends laterally to a side of the protection part 66 to form a strip structure laterally extending. When viewed along a downward direction, the contact convex part 653 is located in the plug guide part 443, and the protection part 66 and the contact arm part 652 have a gap therebetween and do not overlap. The inclined connecting arm 651 maintains an unchanged inclination angle. The protection part 66 and the elastic arm part 65 are independently formed by bending and extending from the lateral outer wall covering part 64.

A free end of the longitudinal peripheral wall covering part 62 serves as a solder pin to be fixed to the printed circuit board. A bottom end of the lateral outer wall covering part 64 serves as a solder pin to extend through the third extending slot 4428 to the printed circuit board for soldering and fixing.

The central guide part 63 includes a first central guide arm 631 formed by bending and extending downward from a lateral inner side of the main body part 61 into the second extending slot 4412, a support bottom arm 632 bending laterally from the bottom of the first central guide arm 631 and extending along the through opening 4431 to the bottoms of the protected parts 451 at two sides of the island part 45, a second central guide arm 634 extending obliquely upward from the support bottom arm 632 to a position above the protected part 451, and a snap-in end part 635 bending downward from a free end of the second central guide arm 634 and snapped into the protected part 454. The first and second central guide arms 631 and 634 are configured to guide the insertion of the plug reinforcing member 30 and protect the longitudinal peripheral wall 441 of the socket body 40 and the protected parts 451 at two lateral ends of the island part 45. The longitudinal outer side surface covering part 35 and the longitudinal inner side surface covering part 34 of the plug reinforcing member 30 are respectively guided by the first and second central guide arms 631 and 634 to enter into a position between the first and second central guide arms 631 and 634 above the support bottom arm 632. However, in an insertion state, the longitudinal outer side surface covering part 35 and the longitudinal inner side surface covering part 34 are not in electrical contact with the first and second central guide arms 631 and 634. During the insertion, the support bottom arm 632 is compressed to generate a supporting force with the printed circuit board attached thereto, such that the first and second central guide arms 631 and 634 have certain elasticity.

A longitudinal width of an upper end of the first central guide arm 631 is greater than that of a lower end. Two longitudinal sides of an upper end of the first central guide arm 631 abut against the stair part 4413 formed at an inner side of the longitudinal peripheral wall 441. A bending structure at a wider upper end of the first central guide arm 631 can increase guidance to the plug reinforcing member 30, thereby avoiding insertion damages.

In a natural state, the contact arm part 652 of the elastic arm part 65 is located at the elastic avoiding part 4424, and a deformation gap exists between the contact arm part 652 and an inner side surface of the support shoulder 4421. When the elastic arm part 65 is longitudinally compressed, the contact convex part 653 of the elastic arm part 65 deforms in the deformation gap.

When the plug A is inserted, a lateral outer side surface covering part 33 of the plug reinforcing member 30 first contacts the protection part 66, the inclined connecting arm 651 of the elastic arm part 65, and the upper end of the first central guide arm 631. When the plug reinforcing member 30 continues to press, the contact convex part 653 is compressed along the longitudinal outer side, causing the contact arm part 652 to elastically deform in the elastic avoiding part 4424 toward an inner wall surface of the support shoulder 4421. In this process, when the plug reinforcing member 30 contacts and longitudinally compresses the protection part 66 and the inclined connecting arm 651, a portion of the protection part 66 extending to a side of the plug guide part receiving cavity 443 is short and is supported by the support shoulder 4421, resulting in small elastic deformation. When a lower end of the inclined connecting arm 651 is longitudinally compressed, the contact arm part 652 may be gradually forced to deform toward the support shoulder 4421. When viewed along a downward direction, an outer side of the contact arm part 652 gradually approaches the protection part 66 and a gap therebetween is reduced, thereby avoiding damages to the contact arm part 652 when the plug reinforcing member 30 is inserted into the contact arm part 652. At the same time, an upper end of the contact arm part 652 is of an arc-shaped structure to better guide the insertion of the plug reinforcing member 30 without damaging the contact arm part 652. The protection part 66 is located at a lateral outer side of the elastic arm part 65.

According to the board-to-board socket of the present disclosure, the contact arm part 652 of the elastic arm part 65 extends to a side of the protection part 66 along the lateral direction, so that, when the plug reinforcing member 30 is inserted, the inclined connecting arm 651 is compressed to guide the contact arm part 652 to approach a side of the protection part 66 along the longitudinal direction, to avoid damages to the contact arm part 652 by the plug.

Embodiment Two

Figure 12:
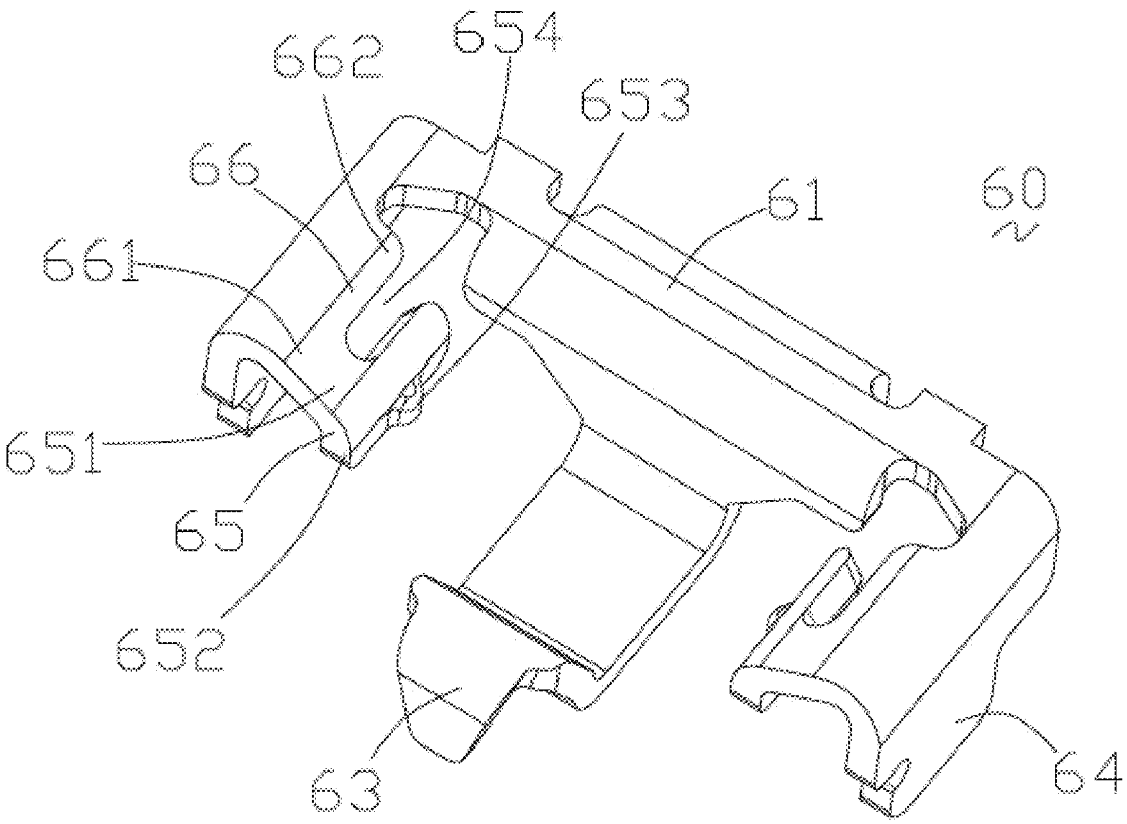
FIG. 12 is a three-dimensional view of a socket reinforcing member of a board-to-board socket according to Embodiment two.
Figure 13:
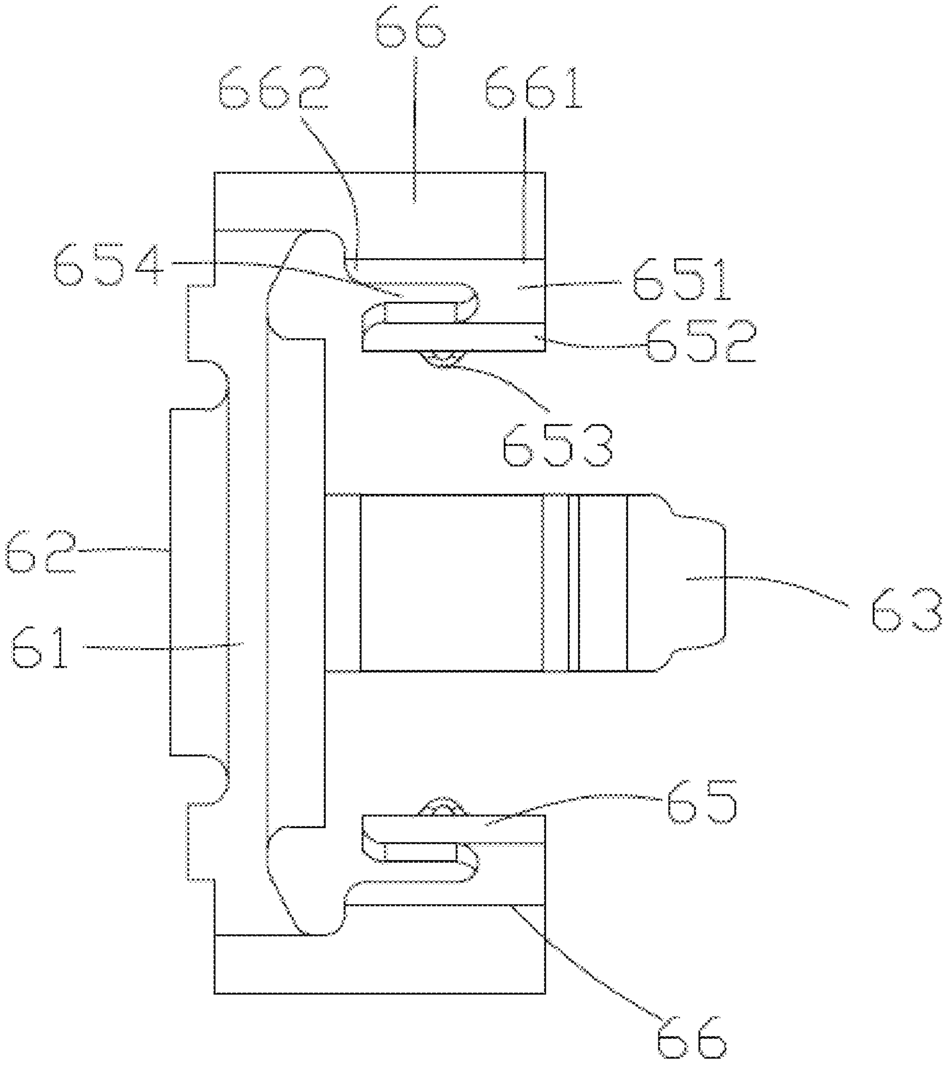
FIG. 13 is a top view of the socket reinforcing member of the board-to-board socket according to Embodiment two.

FIG. 12 and FIG. 13 show a socket reinforcing member 60 according to Embodiment two.

Upon comparison, Embodiment two is mainly different from Embodiment one in a structure of the socket reinforcing member 60. That is, the protection part 66 and the inclined connecting arm 651 of the elastic arm part 65 are integrally connected and are formed by bending from the top of the lateral outer wall covering part 64, which is collectively referred to as the protection part 66 herein. The protection part 66 is divided into first and second protection parts 661 and 662 in the lateral direction. The elastic arm part 65 is formed by extending obliquely downward from the first protection part 661. The elastic arm part 65 includes an inclined connecting arm 651 formed by extending obliquely from a lower end of the first protection part 661 to the plug guide part receiving cavity 443, a contact arm part 652 formed by bending vertically downward from a lower end of the inclined connecting arm 651, and a contact convex part 653 formed by stamping from the contact arm part 652 to the plug guide part receiving cavity 443. The contact arm part 652 laterally extends to a side of the second protection part 662 and is separated from the second protection part 662 to form a partition slot 654.

The technical effect achieved by Embodiment two is the same as that achieved by Embodiment one. Embodiment one is a preferred embodiment.

It should be noted that the printed circuit board to which the plug A or the socket B is attached in this specification of the present disclosure is not limited to a circuit board, and can also be any object provided with a current transmission line.

The above description merely illustrates some embodiments of the present disclosure and is not intended to limit the present disclosure. The present disclosure may be subject to various changes and variations for those skilled in the art. Any modification, equivalent replacement, improvement etc. made within a concept of the present disclosure shall fall within the scope of claims of the present disclosure.

What is claimed is:

1. A board-to-hoard socket, comprising:

a socket body;

a socket terminal; and a socket reinforcing member, wherein the socket body comprises a bottom wall, socket side walls formed by protruding upward from two longitudinal ends of the bottom wall, socket guide parts formed at two lateral ends of the socket body, and an island part formed by protruding upward from the bottom wall, wherein each of the socket guide parts comprises a plug guide part receiving cavity, a longitudinal peripheral wall located at a lateral outer side of the plug guide part receiving cavity, and a pair of lateral peripheral walls located at two longitudinal sides of the plug guide part receiving cavity, wherein the socket reinforcing member comprises a main body part covering a surface of the longitudinal peripheral wall, lateral peripheral wall covering parts which extend from the main body part and cover the lateral peripheral walls, and an elastic arm part and a protection part formed by bending and extending from top ends of the lateral peripheral wall covering parts toward a side of the plug guide part receiving cavity, wherein the elastic arm part comprises: an inclined connecting arm formed by bending and extending obliquely downward from the lateral peripheral wall covering parts, a contact arm part formed by bending vertically from the inclined connecting arm, and a contact convex part formed by stamping from the contact arm part toward the plug guide part receiving cavity, and wherein an end of the contact arm part extends to a side of the protection part along the lateral direction.

2. The board-to-board socket according to claim 1, wherein an upper end of the contact arm part is of an arc surface structure, and the inclined connecting arm and the protection part are inclined at a same angle.

3. The board-to-board socket according to claim 1, wherein when viewed along a downward direction, a gap is formed between the protection part and the contact arm part, and the protection part is located at a longitudinal outer side of the contact arm part.

4. The board-to-board socket according to claim 1, wherein the lateral peripheral walls of the socket body comprise a support shoulder and an elastic avoiding part located at a longitudinal inner side of the support shoulder and communicating with the plug guide part receiving cavity, wherein the elastic arm part bends from the top ends of the lateral peripheral wall covering parts across the support shoulder and then enters into the elastic avoiding part, and the contact convex part is located in the plug guide part receiving cavity.

5. The board-to-board socket according to claim 4, wherein the protection part bends from the top ends of the lateral peripheral wall covering parts across the support shoulder and then reaches above the elastic avoiding part, and the contact arm part is located below an inclined extension direction of the protection part.

6. The board-to-board socket according to claim 5, wherein a mounting step part is formed at a longitudinal outer side of the support shoulder, the lateral peripheral wall covering parts extend to the mounting step part, and a thickness of the support shoulder decreases along an upward direction and comprises a thicker part at a bottom position and a thinner part at a top position.

7. The board-to-board socket according to claim 6, wherein a side of the thinner part facing the plug guide part receiving cavity is provided with an inclined plane at a large angle, and a free end of the protection part is supported on the inclined plane at a large angle; and wherein an end of the thinner part at a longitudinal outer side is provided with an inclined plane at a small angle, and the inclined plane at a small angle forms a bending radian for avoiding the inclined connecting arm and the protection part.

8. The board-to-board socket according to claim 4, wherein when a plug is inserted into the socket, the plug comprises a plug reinforcing member inserted into the plug guide part receiving cavity, the plug reinforcing member contacts and compresses the protection part and the inclined connecting arm along two longitudinal ends, the protection part is supported by the support shoulder, and when a lower end of the inclined connecting arm is compresses by the plug reinforcing member, the contact arm part is forced to deform toward the protection part to reduce a gap between the contact arm part and the protection part in a vertical projection direction, so as to enable the plug reinforcing member to be smoothly inserted into and electrically contact the contact convex part.

9. The board-to-board socket according to claim 1, wherein two lateral ends of the island part are provided with protected parts which are lower than the island part in a horizontal level; wherein the socket reinforcing member further comprises a central guide part bending downward from a lateral inner side of the main body part and extending to the protected parts and covering the protected parts; wherein the central guide part comprises: a first central guide arm formed by bending downward from the lateral inner side of the main body part, a support bottom arm bending and extending from a bottom of the first central guide arm to a side of the protected part, a second central guide arm extending obliquely upward from the support bottom arm to a position above the protected part, and a snap-in end part bending downward from a free end of the second central guide arm and snapped into the protected part.

10. The board-to-board socket according to claim 9, wherein two longitudinal ends of the longitudinal peripheral wall facing the plug guide part receiving cavity are provided with stair parts, a longitudinal width of an upper end of the first central guide arm is greater than a longitudinal width of a lower end of the first central guide arm, and bottoms of two longitudinal ends of the upper end of the first central guide arm are located above the stair parts.

11. A board-to-board socket, comprising:

a socket body;

a socket terminal; and a socket reinforcing member, wherein the socket body comprises a bottom wall, socket side walls formed by protruding upward from two longitudinal ends of the bottom wall, socket guide parts formed at two lateral ends of the socket body, and an island part formed by protruding upward from the bottom wall, wherein each of the socket guide parts comprises a plug guide part receiving cavity, a longitudinal peripheral wall located at a lateral outer side of the plug guide part receiving cavity, and a pair of lateral peripheral walls located at two longitudinal sides of the plug guide part receiving cavity, wherein the socket reinforcing member comprises a main body part covering a surface of the longitudinal peripheral wall, lateral peripheral wall covering parts which extend from the main body part and cover the lateral peripheral walls, and a protection part formed by bending and extending from top ends of the lateral peripheral wall covering parts toward a side of the plug guide part receiving cavity, wherein the protection part comprises a first protection part and a second protection part in a lateral direction, and the first protection part continues to extend obliquely downward to form an elastic arm part, wherein the elastic arm part comprises: an inclined connecting arm formed by extending obliquely from the first protection part, a contact arm part formed by bending vertically from the inclined connecting arm, and a contact convex part formed by stamping from the contact arm part toward the plug guide part receiving cavity, and wherein an end of the contact arm part extends to a side of the second protection part along the lateral direction, and when viewed along a downward direction, a partition slot is formed between the second protection part and the contact arm part.

12. The board-to-board socket according to claim 11, wherein an upper end of the contact arm part is of an arc surface structure, and the inclined connecting arm and the protection part are extended and inclined at a same angle.

13. The board-to-board socket according to claim 11, wherein the partition slot is configured to cut a connection part between the second protection part and an end of the contact arm part to increase elastic property of the contact arm part, and the protection part is located at a longitudinal outer side of the contact arm part.

14. The board-to-board socket according to claim 11, wherein the lateral peripheral walls of the socket body comprise a support shoulder and an elastic avoiding part located at a longitudinal inner side of the support shoulder and communicating with the plug guide part receiving cavity, wherein the elastic arm part bends from the top ends of the lateral peripheral wall covering parts across the support shoulder and then enters into the elastic avoiding part, and the contact convex part is located in the plug guide part receiving cavity.

15. The board-to-board socket according to claim 14, wherein the protection part bends from the top ends of the lateral peripheral wall covering parts across the support shoulder and then reaches above the elastic avoiding part, and the contact arm part is located below an inclined extension direction of the second protection part.

16. The board-to-board socket according to claim 15, wherein a mounting step part is formed at a longitudinal outer side of the support shoulder, the lateral peripheral wall covering parts extend to the mounting step part, and a thickness of the support shoulder decreases along an upward direction and comprises a thicker part at a bottom position and a thinner part at a top position.

17. The board-to-board socket according to claim 16, wherein a side of the thinner part facing the plug guide part receiving cavity is provided with an inclined plane at a large angle, and a free end of the protection part is supported on the inclined plane at a large angle; and wherein an end of the thinner part at a longitudinal outer side is provided with an inclined plane at a small angle, and the inclined plane at a small angle forms a bending radian for avoiding the inclined connecting arm and the protection part.

18. The board-to-board socket according to claim 17, wherein a lower end of the protection part is supported on the inclined plane at a large angle at an inner side of the support shoulder.

19. The board-to-board socket according to claim 11, wherein two lateral ends of the island part are provided with protected parts which are lower than the island part in a horizontal level; wherein the socket reinforcing member further comprises a central guide part bending downward from a lateral inner side of the main body part and extending to the protected parts and covering the protected parts; wherein the central guide part comprises: a first central guide arm formed by bending downward from the lateral inner side of the main body part, a support bottom arm bending and extending from a bottom of the first central guide arm to a side of the protected part, a second central guide arm extending obliquely upward from the support bottom arm to a position above the protected part, and a snap-in end part bending downward from a free end of the second central guide arm and snapped into the protected part.

20. The board-to-board socket according to claim 19, wherein two longitudinal ends of the longitudinal peripheral wall facing the plug guide part receiving cavity are provided with stair parts, a longitudinal width of an upper end of the first central guide arm is greater than a longitudinal width of a lower end of the first central guide arm, and bottoms of two longitudinal ends of the upper end of the first central guide arm are located above the stair parts.

* * * * *